US011514476B2

(12) United States Patent
Raman

(10) Patent No.: US 11,514,476 B2
(45) Date of Patent: *Nov. 29, 2022

(54) CROSS-BROWSER, CROSS-MACHINE RECOVERABLE USER IDENTIFIERS

(71) Applicant: PayPal, Inc., San Jose, CA (US)

(72) Inventor: Srinivasan Raman, Cupertino, CA (US)

(73) Assignee: PayPal, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/069,618

(22) Filed: Oct. 13, 2020

(65) Prior Publication Data

US 2021/0133816 A1 May 6, 2021

Related U.S. Application Data

(63) Continuation of application No. 14/621,279, filed on Feb. 12, 2015, now abandoned, which is a continuation of application No. 13/569,936, filed on Aug. 8, 2012, now Pat. No. 8,977,560.

(51) Int. Cl.
*G06Q 30/02* (2012.01)
*H04L 67/50* (2022.01)
*H04L 67/02* (2022.01)

(52) U.S. Cl.
CPC ..... *G06Q 30/0269* (2013.01); *G06Q 30/0255* (2013.01); *H04L 67/02* (2013.01); *H04L 67/535* (2022.05)

(58) Field of Classification Search
CPC ............ G06Q 30/0269; G06Q 30/0255; H04L 67/02; H04L 67/22
See application file for complete search history.

(56) References Cited

U.S. PATENT DOCUMENTS

| 6,073,241 | A | 6/2000 | Rosenberg et al. |
| 6,510,464 | B1 | 1/2003 | Grantges, Jr. et al. |
| 6,859,833 | B2 | 2/2005 | Kirsch et al. |
| 7,302,402 | B2 | 11/2007 | Callaghan et al. |
| 7,349,912 | B2 | 3/2008 | Delany et al. |
| 7,380,008 | B2 | 5/2008 | Teng et al. |

(Continued)

OTHER PUBLICATIONS

U.S. Appl. No. 13/569,936, Examiner Interview Summary dated May 20, 2014, 3 pgs.

(Continued)

*Primary Examiner* — Breffni Baggot

(57) ABSTRACT

Methods and systems to identify a user across multiple browsers and machines are described. In some embodiments, a web request is received at a retrieval service from a browser. The web request may include a request to access a retrieval service website of the retrieval service and may be initiated by a redirection of the browser from a requesting service to the retrieval service. A unique identifier associated with a user logged in to an account of the retrieval service may be determined. The user may be logged in to the account via the browser. A redirect request is sent from the retrieval service to the browser. The redirect may include the unique identifier and may redirect the browser from the retrieval service website to the requesting service. The unique identifier may be used by the requesting service to perform additional functionality specific to the user.

20 Claims, 6 Drawing Sheets

(56) References Cited

U.S. PATENT DOCUMENTS

| | | | |
|---|---|---|---|
| 7,484,001 B2 | 1/2009 | Lerner | |
| 7,783,719 B2* | 8/2010 | Miller | G06Q 30/02 709/224 |
| 7,904,600 B2 | 3/2011 | Madril, Jr. et al. | |
| 8,027,921 B1 | 9/2011 | Boydstun et al. | |
| 8,131,799 B2 | 3/2012 | Landsman et al. | |
| 8,195,508 B1* | 6/2012 | Calder | G06Q 30/0207 705/14.1 |
| 8,464,327 B2 | 6/2013 | Lerner | |
| 8,484,283 B2* | 7/2013 | Afergan | H04L 67/34 709/224 |
| 8,484,333 B2 | 7/2013 | Roskind et al. | |
| 8,527,629 B2 | 9/2013 | Manning et al. | |
| 8,869,256 B2* | 10/2014 | Sample | H04L 67/2823 726/8 |
| 8,977,560 B2 | 3/2015 | Raman | |
| 2002/0029290 A1* | 3/2002 | Burema | G06Q 30/0277 705/26.1 |
| 2002/0112185 A1 | 8/2002 | Hodges | |
| 2003/0037131 A1 | 2/2003 | Verma | |
| 2003/0135548 A1 | 7/2003 | Bushkin | |
| 2005/0216582 A1 | 9/2005 | Toomey et al. | |
| 2005/0223093 A1 | 10/2005 | Hanson et al. | |
| 2006/0218630 A1 | 9/2006 | Pearson et al. | |
| 2006/0265493 A1 | 11/2006 | Brindley et al. | |
| 2006/0271671 A1 | 11/2006 | Hansen | |
| 2007/0027986 A1 | 2/2007 | Joshi et al. | |
| 2008/0086523 A1 | 4/2008 | Afergan et al. | |
| 2008/0086524 A1 | 4/2008 | Afergan et al. | |
| 2008/0201311 A1 | 8/2008 | Ertugrul et al. | |
| 2009/0265460 A1 | 10/2009 | Balasubramanian et al. | |
| 2010/0100952 A1* | 4/2010 | Sample | H04L 67/22 726/9 |
| 2011/0022461 A1 | 1/2011 | Simeonov | |
| 2011/0277027 A1 | 11/2011 | Hayton et al. | |
| 2011/0314114 A1 | 12/2011 | Young et al. | |
| 2012/0124206 A1 | 5/2012 | Butler et al. | |
| 2012/0179541 A1 | 7/2012 | Pasila et al. | |
| 2012/0272292 A1* | 10/2012 | Chabbewal | H04L 63/08 709/224 |
| 2012/0324060 A1 | 12/2012 | Afergan et al. | |
| 2013/0086656 A1* | 4/2013 | Paddon | G01S 19/246 726/6 |
| 2013/0086670 A1* | 4/2013 | Vangpat | H04L 63/0815 726/8 |
| 2014/0046772 A1* | 2/2014 | Raman | G06Q 30/0255 705/14.66 |

OTHER PUBLICATIONS

U.S. Appl. No. 13/569,936, Examiner Interview Summary dated Sep. 22, 2014, 3 pgs.

U.S. Appl. No. 13/569,936, Final Office Action dated Jun. 27, 2014, 17 pgs.

U.S. Appl. No. 13/569,936, Non Final Office Action dated Feb. 11, 2014, 17 pgs.

U.S. Appl. No. 13/569,936, Notice of Allowance dated Oct. 29, 2014, 10 pgs.

U.S. Appl. No. 13/569,936, Response filed Sep. 18, 2014 to Final Office Action dated Jun. 27, 2014, 15 pqs.

U.S. Appl. No. 13/569,938, Response filed Jun. 11, 2014 to Non Final Office Action dated Feb. 11, 2014, Jun. 11, 2014.

* cited by examiner

GUID User Data

| GUID | creation date | IP address | browser type | machine info | timestamp |
|---|---|---|---|---|---|
| 123 | 02-01-2010 | 123.4.5.6 | Internet Explorer | DeviceID1 | 02-01-2010 06:30:59 |
| 123 | 02-01-2010 | 987.6.5.4 | Firefox | DeviceID2 | 06-24-2011 11:57:16 |
| 456 | 08-26-2010 | 456.1.2.3 | Firefox | DeviceID3 | 08-26-2010 15:46:34 |

FIG. 5

User Activity History

| GUID | website | ad URL | display count | click count | timestamp |
|---|---|---|---|---|---|
| 123 | xyz.com | ad1.com | 1 | 0 | 02-01-2010 06:30:59 |
| 123 | abc.net | ad2.com | 4 | 1 | 06-24-2011 11:57:16 |
| 456 | a123.com | ad3.com | 2 | 1 | 08-26-2010 15:46:34 |

FIG. 6

CROSS-BROWSER, CROSS-MACHINE RECOVERABLE USER IDENTIFIERS

RELATED APPLICATION

The present application is a continuation of U.S. Appl Ser. No. 14/621,279, filed Feb. 12, 2015, which is a continuation of U.S. application Ser. No. 13/569,936, filed on Aug. 8, 2012 know U.S. Pat. No. 8,977,560); the disclosures of each of the above-referenced applications are incorporated by reference herein in its their entireties.

TECHNICAL FIELD

The present disclosure generally relates to network communications and, more specifically, to systems and methods for identifying users across multiple browsers and across multiple machines.

BACKGROUND

Knowing the identity of a user visiting a website may be useful for several reasons. For example, many websites display advertisements to users. Typically, advertisements may be more effective if they are targeted to a user's personal preferences and/or interests. In order to target an advertisement to a particular user viewing a website, the website server needs to know additional information about the user. One example of information that a website server may track is the set of pages visited by the user. An example of information that an advertising server may track is the set of advertisements displayed to a user and the set of advertisements clicked by the user. Website servers and advertisement servers can display relevant content or advertisements to a user if they have access to such information. Typically, website servers and advertisements servers use a browser cookie to store the identity of a user.

However, once the cookies are cleared from the user's browser, the website server may no longer be able to determine the identity of the user. For example, a website server may receive a web request from a browser of a user, but without any other information, the website server may be unable to determine the user's identity, preventing the website server from displaying advertisements targeted specifically to the user.

Additionally, knowing the identity of a user may be useful for a website server to determine statistics about traffic on the server. For example, it may be useful to know the identities of users so that a website server can determine whether a particular web request is received from a new user or from a user who previously visited the website. However, determining the identity of a user visiting a website of a website server may be especially difficult for web servers which primarily experience guest traffic (e.g., websites which are more likely accessed without a user having to log in to a user account for the website).

BRIEF DESCRIPTION OF THE DRAWINGS

Some embodiments are illustrated by way of example and not limitation in the figures of the accompanying drawings.

FIG. 5 is an exemplary table of data associated with the identity of the user, according to some embodiments.

FIG. 6 is an exemplary table of data associated with the activity history of the user, according to some embodiments.

DETAILED DESCRIPTION

Figure 1:
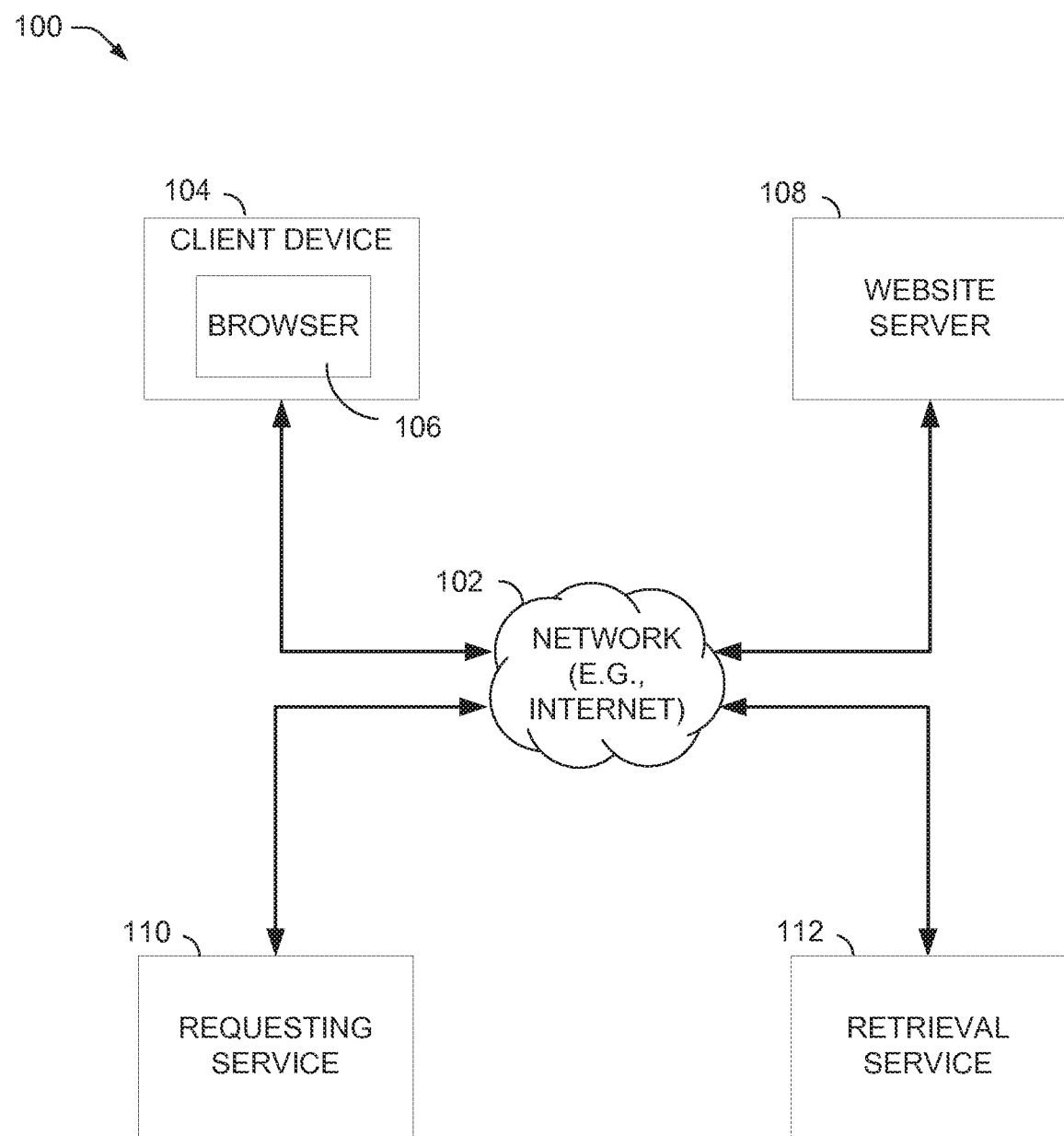
FIG. 1 is a block diagram of an exemplary system for communication between a user, a requesting service, and a retrieval service, according to some embodiments.

Example systems and methods to identify a user across multiple browsers and machines are described. In the following description, for purposes of explanation, numerous specific details are set forth in order to provide a thorough understanding of example embodiments. It will be evident, however, to one skilled in the art that the present technology may be practiced without these specific details.

A retrieval service maintaining information about the identity of and attributes associated with users may be used to retrieve a globally unique identifier (GUID) associated with a user in response to a request from a requesting service. A GUID may be unique to a user across multiple browsers and across multiple devices. The retrieval service may be any web server for which a user typically logs in to access an account the user may maintain with the web server. As such, the retrieval service 112 may be able to determine the identity of the currently logged in user or the identity of the last logged in user. In some embodiments, the retrieval service server may be a web server for a popular website, such as, e.g., social networking websites or email websites, since many online users may frequently be logged in to one of any variety of these popular websites and may continue to stay logged in to these sites throughout the day.

The requesting service may be any web server which may request the GUID associated with a user. For example, the requesting service may be any web server that wishes to know the identity of a user visiting the requesting service web server. The requesting service may wish to know the identity of a user for any number of reasons. For example, the web server may wish to monitor user traffic on the server, maintain information associated with users visiting a website of the server, provide personalized content to the user based on websites the user has visited previously, or the web server may wish to direct more relevant advertisements to a user. Examples of a web server for a requesting service may include any website for which guest traffic is allowed (e.g., websites which do not require a visitor of the website to log in to an account or provide any identifying information), such as, e.g., a news website, a product review website, etc. Once the GUID for a user is determined, the requesting service may maintain information about the user in a database and associate that information with the GUID.

For explanatory purposes, a specific implementation will be described. However, this implementation is one of several manners in which the technology disclosed herein may be implemented and is merely described here for exemplary purposes. In this example, a user may visit a website of the requesting service (e.g., a news website) via a browser on a user device. The news website server may wish to target advertisements that are more relevant to the user visiting the website. If the requesting service is unable to determine the identity of the user (e.g., the user is not logged in to an account of the requesting service or the user's device does not contain a cookie previously stored by the news website), the requesting service may redirect the user's browser to the retrieval service (e.g., a social networking website). The retrieval service may determine whether the user is logged in or was previously logged in to the user's social networking account on the retrieval service by determining the presence of a cookie associated with the retrieval service in the redirection. If the user is logged in or a cookie associated with the retrieval service was included in the redirection request (e.g., because the cookie was stored on the user's device), the retrieval service may determine the GUID associated with the user. The retrieval service may then redirect the user's browser back to the requesting service, returning the GUID to the requesting service via the redirection. The requesting service may then use the GUID to access information associated with the user from a user profile database at the requesting service. The information may include any information that has been captured by the requesting service about the user, including demographic information (e.g., age, gender, race, marital status, etc.), webpages of the requesting service the user has viewed in the past, contextual information from the webpage of the requesting service that the user has viewed in the past, behavioral information, history of prior purchases, advertisements previously displayed to the user, advertisements previously clicked on by the user, products previously viewed, etc.

In some embodiments, the requesting service may also initiate communication with a user via the retrieval service to target the user associated with a given GUID returned by the retrieval service. For example, the requesting service may arrange for the retrieval service to pass on any targeted advertisements or offers to the user identified by a particular GUID that was provided to the requesting service by the retrieval service. When that user logs on to the user's account associated with the retrieval service, the targeted advertisements or offers may be displayed to the user. In some embodiments, the retrieval service may also be used to send targeted emails or notifications on mobile devices on behalf of the requesting service.

FIG. 1 is a block diagram of an exemplary system 100 for communication between a user, a website server 108, a requesting service 110, and a retrieval service 112. The client device of the user 104, the website server 108, the requesting service 110, and the retrieval service 112 may be in communication with each other via the network 102. The network 102 may be any suitable communication network for communication between one or more servers (e.g., the Internet).

The client device 104 may be any device a user may use to access the website server 108, requesting service 110, or retrieval service 112. Examples of client devices may include computing devices such as, e.g., mobile devices, desktop devices, etc. Access may be provided to the client device 104 via a web browser application 106 on the client device 104.

The website server 108 and the requesting service 110 may be servers for any website that a user may visit via the browser 106. The requesting service 110 may be a web server that may request from the retrieval service 112 a GUID associated with a user visiting the requesting service 110. In some embodiments, the requesting service 110 may be a part of the website server 108. For example, the website may be a product review website or a news website. The website may wish to determine the identity of the user visiting the website page and may request the GUID associated with the user from the retrieval service 112.

In some embodiments, a website (e.g., website server 108) may allow a third-party advertising server (e.g., requesting service 110) to advertise on the website page. For example, the website may be a news website, which may allow a third-party advertising server to display advertisements on a portion of the website page (e.g., using Javascript). The website may pass information about a user visiting the website to the advertising server to enable the advertising server to better target the user. The advertising server may wish to look up more information about the user, such as advertisements previously shown to the user, advertisements clicked by the user, and the like, to better target the advertisements to the user. If the advertising server is unable to retrieve the identity of the user from the request, the advertising server may request the GUID associated with the user from the retrieval service 112.

The retrieval service 112 may be any server for which a user may have an account. The retrieval service 112 may be able to determine the identity of a user when the user is logged in to the user's account and return an identifier associated with the user (e.g., GUID) to any requesting server, such as requesting service 110. The retrieval service 112 may also be able to determine the likely identity of a user when the user is not logged in to the user's account, based on cookies present in the user's browser. If any cookies associated with the user's account are present in the user's browser, the cookies may be used to retrieve an identifier associated with the last logged in user (e.g., a GUID) from the client device 104 and return the identifier to any requesting server, such as requesting service 110. In some embodiments, the retrieval service 112 may be any web servers for popular websites that a user may typically be logged in to for extended periods of time, such as social networking sites, email provider sites, and the like.

Figure 2:
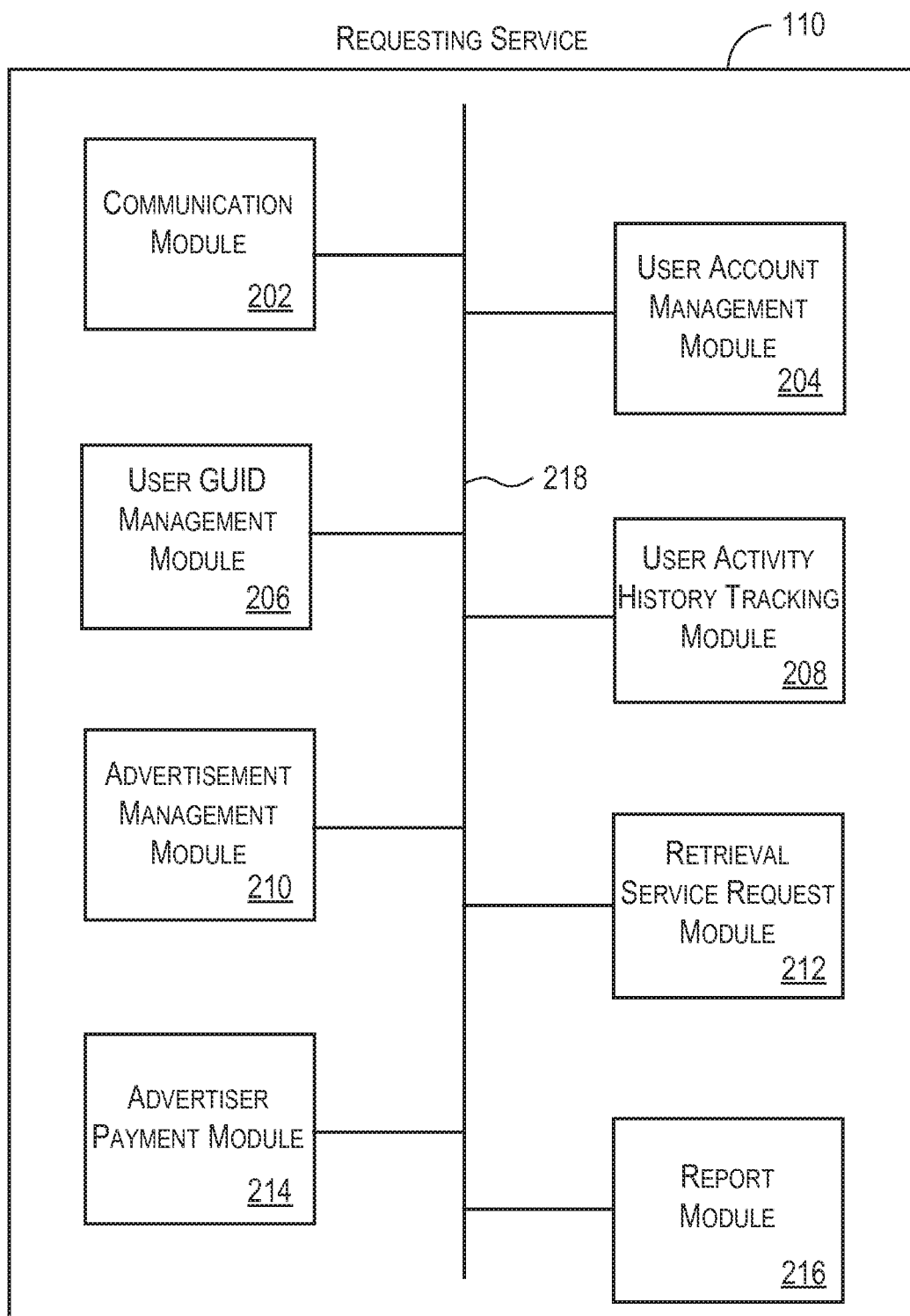
FIG. 2 is a block diagram of exemplary components of a requesting service, according to some embodiments.

FIG. 2 is a block diagram of exemplary components of a requesting service 110. In various embodiments, requesting service 110 may implement computer programs, logic, applications, methods, processes, or software to request an identifier associated with a user and to use the identifier to access information associated with the user. The components of the requesting service 110 may include a communication module 202, a user account management module 204, a user GUID management module 206, a user activity history tracking module 208, an advertisement management module 210, a retrieval service request module 212, an advertiser payment module 214, and a report module 216. A communication bus 218 is coupled to the various modules and components in requesting service 110, thereby allowing the modules and components to communicate with one another. Communication bus 218 may use any communication protocol and any communication media.

In the embodiment of FIG. 2, requesting service 110 includes a communication module 202 that communicates with other systems and components to implement the functions described herein. The communication module 202 may also facilitate communication with a browser by receiving web requests to access a website of the requesting service 110 and responding accordingly by providing the website via, e.g., a hypertext transfer protocol (HTTP) request.

The user account management module 204 may manage user accounts for the requesting service 110. However, in some embodiments, the requesting service 110 may operate without allowing users to open accounts associated with the requesting service 110. The requesting service 110 may provide a service to visitors of the websites managed by the requesting service 110, and the requesting service 110 may allow users to register for accounts which provide access to elements of the requesting service 110 (although in some embodiments, users may still be able to access content of the requesting service 110 without accessing a user account). Examples of requesting service 110 services include news services, product review services, etc. The user account management module 204 may manage any user accounts for users registered with the requesting service 110. This may include managing any user-related information for each user account, such as, e.g., user profile information, user preferences, etc.

The user GUID management module 206 may manage GUIDs for users, whether or not the user is registered with the requesting service 110. This may include associating a user's GUID with information associated with the user, such as, e.g., a date the GUID was created for the user, the type of browser used by the user, device information for the user, demographic information for the user, etc. The GUID management module 206 may manage user GUIDs and information associated with each GUID.

The user activity history tracking module 208 may collect and track the user-related information that is associated with the GUID. This may include monitoring and tracking user behavior and activities. The information tracked may include any information relevant to user activity, such as, e.g., websites visited, contextual information from webpages that the user has viewed, user behavioral information, history of prior purchases, advertisements displayed to the user, advertisements previously clicked, products previously viewed, etc.

The advertisement management module 210 may manage advertisements displayed to users visiting the requesting service 110 by providing advertisements to users and, in some instances, determining and providing relevant advertisements to users depending on the user-related information managed by the user GUID management module 206 and the user history tracking module 208.

The retrieval service request module 212 may manage functions related to requesting GUIDs for unidentifiable users visiting the requesting service 110. This may include redirecting a user browser to the retrieval service 112 and receiving a redirect request with the associated GUID back from the browser via the retrieval service 112.

The advertiser payment module 214 may manage advertiser profiles for one or more entities that advertise via the requesting service 110. This may include enrolling advertising entities with the requesting service 110, managing advertisements for each of the advertising entities, managing payment for allowing advertisers to advertise via the requesting service 110, etc.

The report module 216 may generate and provide reports regarding any activity on the requesting server 110. This may include generating reports about user activity, traffic on the requesting service 110, preferences of users, statistics for each advertising entity, statistics relating to the number of times a GUID was requested and/or retrieved from the retrieval service 112, etc.

Figure 3:
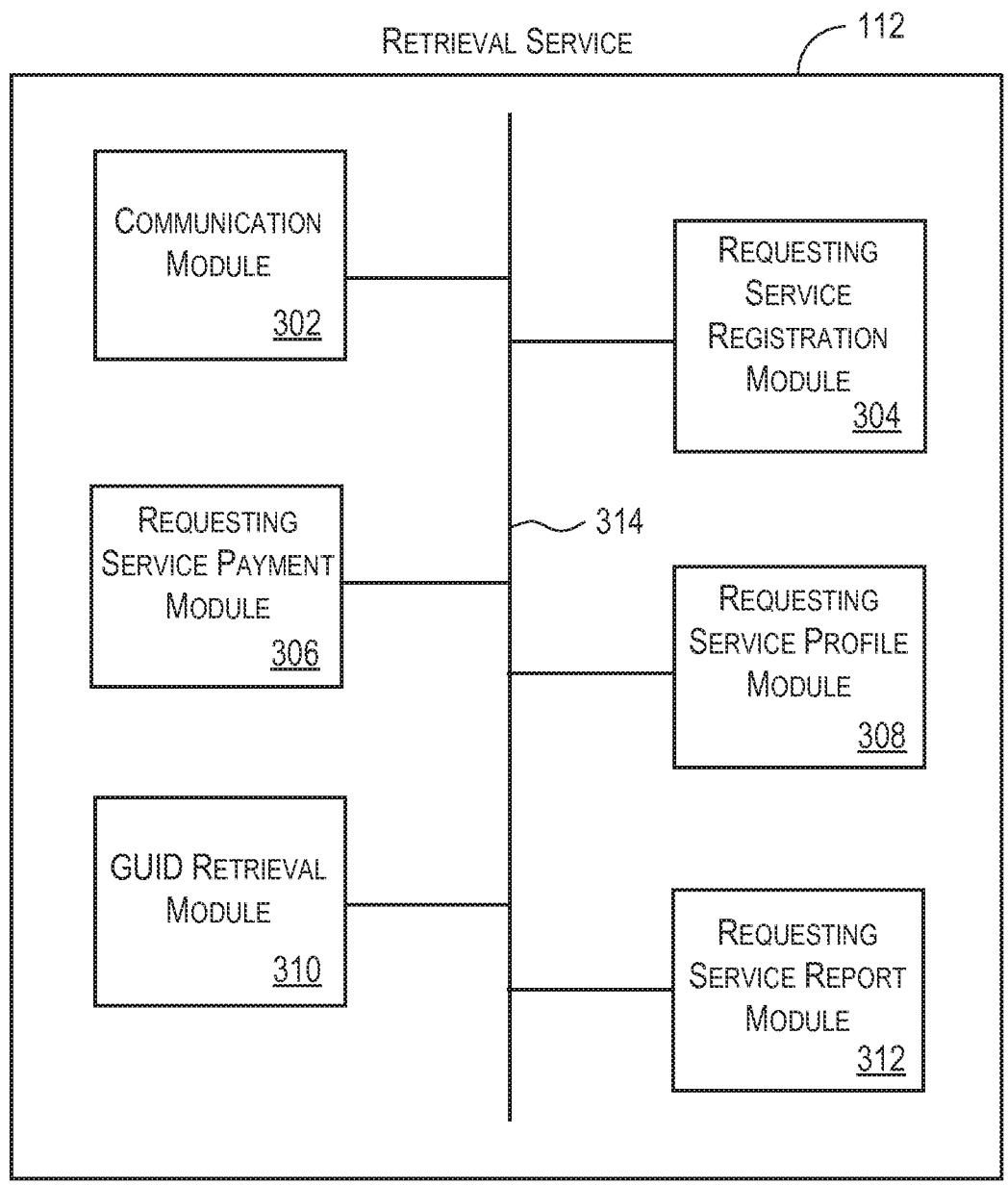
FIG. 3 is a block diagram of exemplary components of a retrieval service, according to some embodiments.

FIG. 3 is a block diagram of exemplary components of a retrieval service 112. In various embodiments, retrieval service 112 may implement computer programs, logic, applications, methods, processes, or software to retrieve an identifier associated with a user registered with the retrieval service, to map this identifier to a GUID associated with a requesting service, and to provide the identifier to the requesting service. The components of the retrieval service 112 include a communication module 302, a requesting service registration module 304, a requesting service payment module 306, a requesting service profile module 308, a GUID retrieval module 310, and a requesting service report module 312. A communication bus 314 is coupled to the various modules and components in retrieval service 112, thereby allowing the modules and components to communicate with one another. Communication bus 314 may use any communication protocol and any communication media.

In the embodiment of FIG. 3, retrieval service 112 includes a communication module 302 that communicates with other systems and components to implement the functions described herein. The communication module 302 may also communicate with a browser by receiving web requests to access a website of the retrieval service 112 from the browser and responding accordingly by providing the website via, e.g., a HTTP request and response.

The requesting service registration module 304 may allow a requesting service (such as requesting service 110) to register for the GUID retrieval services provided by the retrieval service 112. Once a requesting service 110 is registered, the requesting service may be provided with a requesting service identifier such that when a browser is redirected to the retrieval service 112, the identifier may be provided in the redirection request and may be used by the retrieval service 112 to determine which requesting service redirected the browser for GUID retrieval. In some embodiments, upon registration, the requesting service registration module 304 may also provide a web address specific to the requesting service to which a browser may be redirected from the requesting service to the retrieval service.

The requesting service payment module 306 may manage payments that should be made from the requesting service 110 to the retrieval service 112 for services related to providing GUID retrieval. This may include tracking the usage of the services for each requesting service and determining and requesting payment for such services.

The requesting service profile module 308 may manage any profile information for each requesting service registered with the retrieval service 112. This may include any information specific to each requesting service, such as payment profiles (e.g., payment agreements, etc.), requesting service preferences, domain names associated with the requesting service 110, an encryption algorithm and key to be used by the retrieval service 112 to encrypt the GUID before redirecting to the requesting service 110, etc.

The GUID retrieval module 310 may manage the GUIDs for users having accounts with the retrieval service 112. The GUID retrieval module 310 may access a GUID for a user in response to a request in the form of a redirection of the browser from the requesting service 110 and may provide the GUID via a redirection of the browser back to the requesting service 110.

The requesting service report module 312 may generate and provide reports regarding information associated with usage of services by a requesting service 110. This may include generating and providing reports related to the number of times a redirection from the requesting service 110 occurred in any given period, payment received and/or owed, etc.

Figure 4:
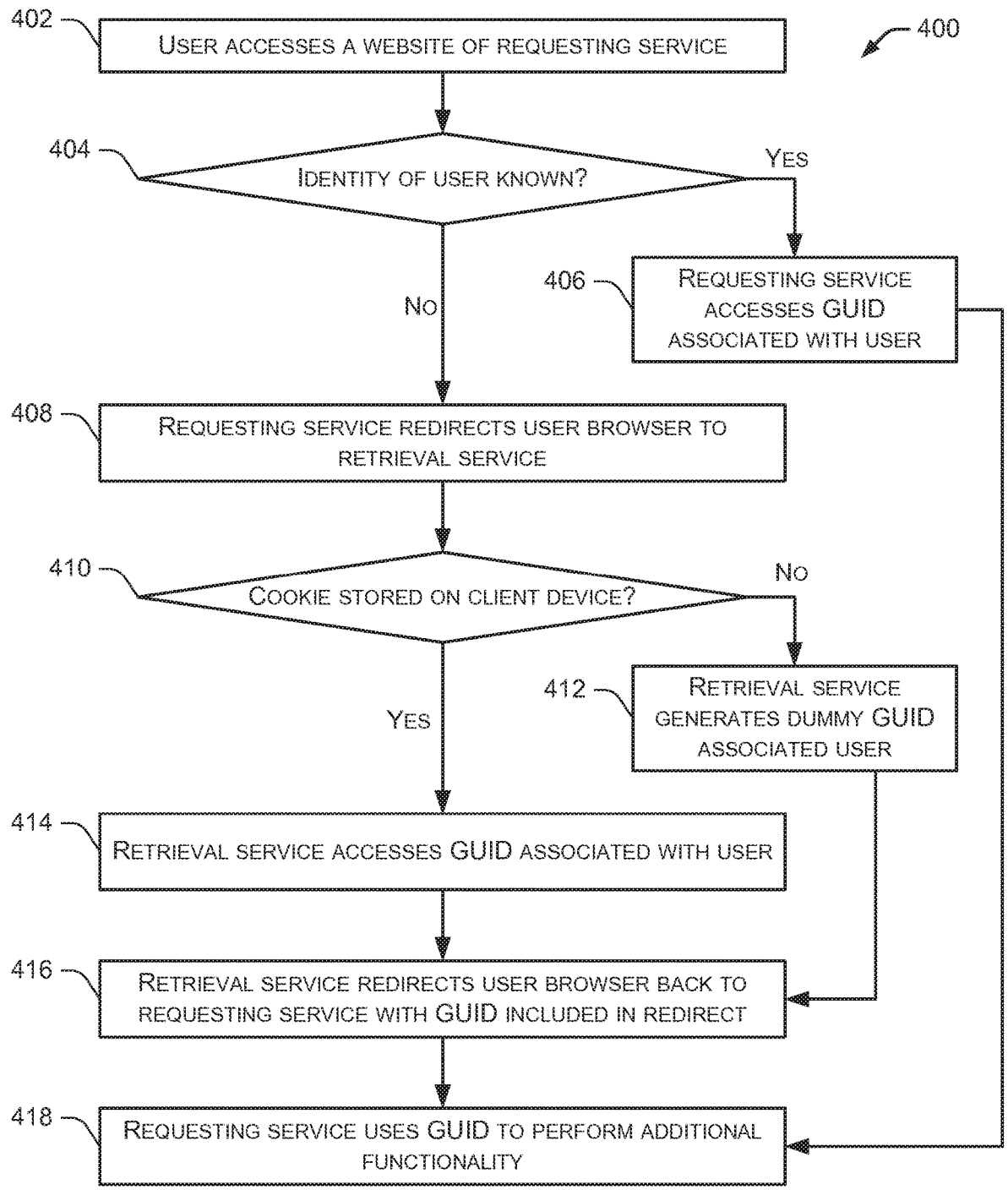
FIG. 4 is a flow chart showing an exemplary method of retrieving an identifier associated with a user, according to some embodiments.

FIG. 4 is a flow chart showing an exemplary method 400 of retrieving an identifier associated with a user. In operation 402, a user may access a website of the requesting service 110 using an HTTP request from the browser to the communication module 202 of the requesting service 110. When a user visits a website of the requesting service 110, the communication module 202 of the requesting service 110 may return the webpage indicated by the request and store a browser cookie on the client device 104. The cookie may include state information associated with the website that stored the cookie, such as authentication information, identification of a user's session (e.g., if logged in to the website), user's preferences, a GUID assigned by the requesting service 110 if user is not logged in to the website, etc.

In operation 404, the requesting service 110 may determine whether the identity of the user accessing the website is known. This may be done by determining whether a cookie associated with the requesting service 110 was previously stored on the client device by the user account management module 204, as a previously stored cookie may contain identifying information associated with the user (e.g., a GUID for the user).

If the requesting service 110 is able to determine the identity of the user, in operation 406, the requesting service 110 may access the GUID associated with the user via the user account management module 204. In operation 418, the requesting service 110 may use the GUID to perform additional functionality relevant to the identity of the user. The additional functionality will be described in more detail below.

If the requesting service is unable to determine the identity of the user, in operation 408, the retrieval service request module 212 of the requesting service 110 may redirect the user's browser to the retrieval service 112. The retrieval service request module 212 of the requesting service 110 may generate a redirect request, which may redirect the browser to the retrieval service 112. That is, the browser may send an HTTP request to access the retrieval service 112 based on the redirect request sent to the browser by the requesting service 110. In some embodiments, the browser is redirected to a web address that is specific to the requesting service 110. For example, the web address specific to the requesting service 110 may include an indication of the retrieval service 112 (e.g., a social networking web address), a requesting service identifier associated with the requesting service 110 (e.g., ReqServID=xyz) as assigned by the retrieval service 112, etc. An example of such a web address specific to the requesting service with a requesting service identifier xyz and requesting a GUID from a retrieval service that is a social networking website may be http://www.socialnetworkingwebsite.com/GUIDretrievar?ReqServID=xyz&Signature=LAPQ01&ReturnURL=http:///www.apopularnewswebsite.com/HomePage. The requesting service identifier may be used by the retrieval service 112 to manage the requesting service's 110 usage of the retrieval service 112 via the requesting service payment module 306 of the retrieval service 112. The requesting service identifier may also be used by the retrieval service 112 to look up a key for a signature algorithm (e.g. HmacMD5) so that the retrieval service 112 can compute the signature of one or more URL parameters to compare against the signature passed in the URL, thus enabling the retrieval service 112 to ensure the GUID retrieval request has indeed originated from the retrieval service associated with the requesting service identifier. The requesting service identifier may also be used by the retrieval service 112 to look up a key for an encryption algorithm (e.g. AES, RC4, etc.) so that the retrieval service 112 can encrypt the GUID being returned by the retrieval service to the requesting service to ensure the GUID is suitably protected.

In operation 410, the retrieval service 112 may receive the request from the browser and may check for the presence of a cookie in the request, which may indicate whether the user is currently or was previously logged into the retrieval service 112 via the GUID retrieval module 310. As previously described, the retrieval service 112 may be any web server (or part of any web server) for which a user may be currently or was previously logged in to an account with the web server. Examples of web servers for the retrieval service 112 may include, e.g., social networking websites, web-based email servers, etc. The retrieval service 112, upon receiving a request, may determine whether the user is currently or was previously logged in via the user's browser to an account with the retrieval service server. This may be performed by determining the presence of a cookie in the request containing identifying information associated with the user and the user's account.

If there is no cookie in the request received by the retrieval service 112, in operation 412, the GUID retrieval module 310 of the retrieval service 112 may generate a dummy GUID associated with the user. The dummy GUID may be any placeholder GUID that the requesting service 110 may use to track information about the user until the user signs in to their account with the retrieval service 112. In some embodiments, the requesting service 110 may be aware that, the GUID returned by the retrieval service 112 is a dummy GUID and may check back with the retrieval service 112 periodically to determine whether the true GUID for the user may be determined (e.g., when the user signs in to an account of the retrieval service 112). When the true GUID is determined by the retrieval service 112 (e.g., the user signs in to an account of the retrieval service 112), the retrieval service 112 may communicate the dummy GUID and the true GUID to the requesting service 110. The requesting service 110 may then use the true GUID to link any data tracked and associated with the dummy GUID with the true GUID subsequently determined.

If the true GUID cannot be determined by the retrieval service 112, in operation 416, the GUID retrieval module 310 of the retrieval service 112 may redirect the user's browser back to the requesting service 110 with the dummy GUID included in the redirection. This may include redirecting the user's browser to a particular return uniform resource locator (URL). In some embodiments, redirecting the user's browser may include validating that the return URL is associated with a domain that is registered with the requesting service 110. In operation 418, the requesting service 110 may use the dummy GUID to perform additional functionality associated with the user.

If the user is currently or was previously logged in to the retrieval service 112, in operation 414, the GUID retrieval module 310 of the retrieval service 112 may access the GUID associated with the user. In some embodiments, the GUID may be accessed from the cookie that the retrieval service 112 stored on the client device.

In operation 416, the GUID retrieval module 310 of the retrieval service 112 may redirect the user's browser back to the requesting service 110 with the GUID included in the redirection. In some embodiments, the GUID retrieval module 310 may first validate whether the domain name in the return URL provided by the requesting service 110 is present in the set of domain names registered by the requesting service 110. The GUID retrieval module 310 may then encrypt the GUID using the key configured by the requesting service and redirect the user's browser back to the return URL provided by the requesting service with the encrypted GUID included in the redirection. The redirect request may include the return URL web address associated with the requesting service 110 and may direct the browser to initiate an HTTP request to access the web address associated with the requesting server 110. When the request associated with the redirection from the retrieval service 112 to the requesting service 110 is received from the browser, the requesting service 110 may store the received GUID in a cookie. Alternatively, the requesting service 110 may use the GUID provided by the retrieval service 112 to map to a GUID that the requesting service may have created and managed for the user and store this GUID in a cookie.

In operation 418, the requesting service 110 may use the GUID stored in the browser cookie to perform additional functionality associated with the user. The additional functionality may include any functions for which the user's identity may be useful. For example, the GUID may be used to determine activity history of the user using the user activity history tracking module 208. The user-specific information may be used to provide ads that may be relevant to the user, increasing the likelihood that the user may be engaged by and respond to the ads. In other examples, the additional functionality may include using the GUID to determine if the user is a new visitor to the requesting service 110 or if the user is returning from a previous visit to the requesting service 110. Reports related to web server traffic at the requesting service 110 may be generated in a more accurate manner by the report module 216 when a user's identity is known.

In some embodiments, the retrieval service 112 may track the use of the retrieval service 112 by the requesting server 110 via the requesting service payment module 306. In some embodiments, the retrieval service 112 may be used by a requesting service 110 that does not have an account registered with the retrieval service 112. In that case, the retrieval service 112 may determine that the requesting service 110 does not have an account because there was no requesting service identifier provided in the redirection of the browser. A new requesting service identifier may be created and stored for the requesting service 110, and a new account may be created via the requesting service registration module 304.

In some embodiments, if a retrieval service 112 is unable to determine the GUID for a user because the user is not logged in to an account of the retrieval service 112, the retrieval service 112 may request GUID information from one or more other retrieval services until a GUID may be determined. In some embodiments, retrieval services may request a GUID from another retrieval service, which may then request a GUID from another retrieval service if the GUID is unknown, and so on, until the GUID is determined and can be passed to the requesting service 110.

In some embodiments, the retrieval service 112 may maintain a GUID that is specific to the requesting service 110. For example, a user having an account with the retrieval service 110 may be associated with one GUID for one requesting service and another GUID for another requesting service.

FIG. 5 is an exemplary table of data 500 associated with the identity (e.g., GUID) of the user and which may be managed and maintained by the user GUID management module 206 of the requesting service 110. The GUID user data table may include any information associated with the identity of the user and an entry in the table 500 may be created each time a user associated with a GUID accesses the requesting service 110. The table of data 500 may store the date that the GUID was created for the user, the IP address associated with the time at which the requesting service 110 was access by the user, the timestamp for the time at which the requesting service 110 was accessed by the user, the type of browser that the user used to access the requesting service 110, and any machine identifying information associated with the client device used to access the requesting service. Although not shown in FIG. 5, the exemplary table of data 500 may also include a column for an external GUID, which may be the GUID provided by the retrieval service 112, and an external GUID provider, which may indicate an identifier associated with the retrieval service 112. The GUID user data table 500 may also store demographic information associated with the user. Knowing the type of browser that a user used to access the requesting service may be used to determine types of advertisements that can be displayed on the browser (e.g., Adobe Flash objects, etc.). The user data for each GUID may be used to determine the frequency with which the user accesses the requesting service 110 and the location from which the user access the requesting service 110 more frequently. This information may be useful for performing any additional functionality related to the user's identity, such as targeting advertisements specifically to the user, determining whether the user is a first time visitor or a returning visitor to the requesting service 110, etc.

Additionally, the information in the exemplary table of data 500 may allow the requesting service 110 to leverage multiple retrieval services. For example, if a particular retrieval service (e.g., server associated with www.apopularsocialnetworksite.com) returns an indication that a GUID cannot be provided (e.g., the user is not signed in), the requesting service 110 may request a GUID from another retrieval server (e.g., www.anequallypopularemailsite.com).

FIG. 6 is an exemplary table of data 600 associated with the activity history of the user, which may be managed and maintained by the user activity history tracking module 208 of the requesting service 110. The user activity history table 600 may store user activity for the user associated with the GUID and may store this information each time the user visits the requesting service, which may be indicated by the timestamp. The user activity history table 600 may store any user activity information, such as, e.g., the website of the requesting server 110 that the user visited, any web addresses fir advertisements provided to the user, the number of times the advertisement was displayed (e.g., display count), the number of times the user clicked on the advertisement displayed (e.g., click count), and the timestamp for each entry in the table 600. As previously described, this information may be used to perform any additional functionality related to the user's identity, such as, e.g., targeting advertisements specifically to the user.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA)

or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily, configured hardware may be a design choice. Below are set out hardware (e.g., machine) and software architectures that may be deployed, in various example embodiments.

Figure 7:
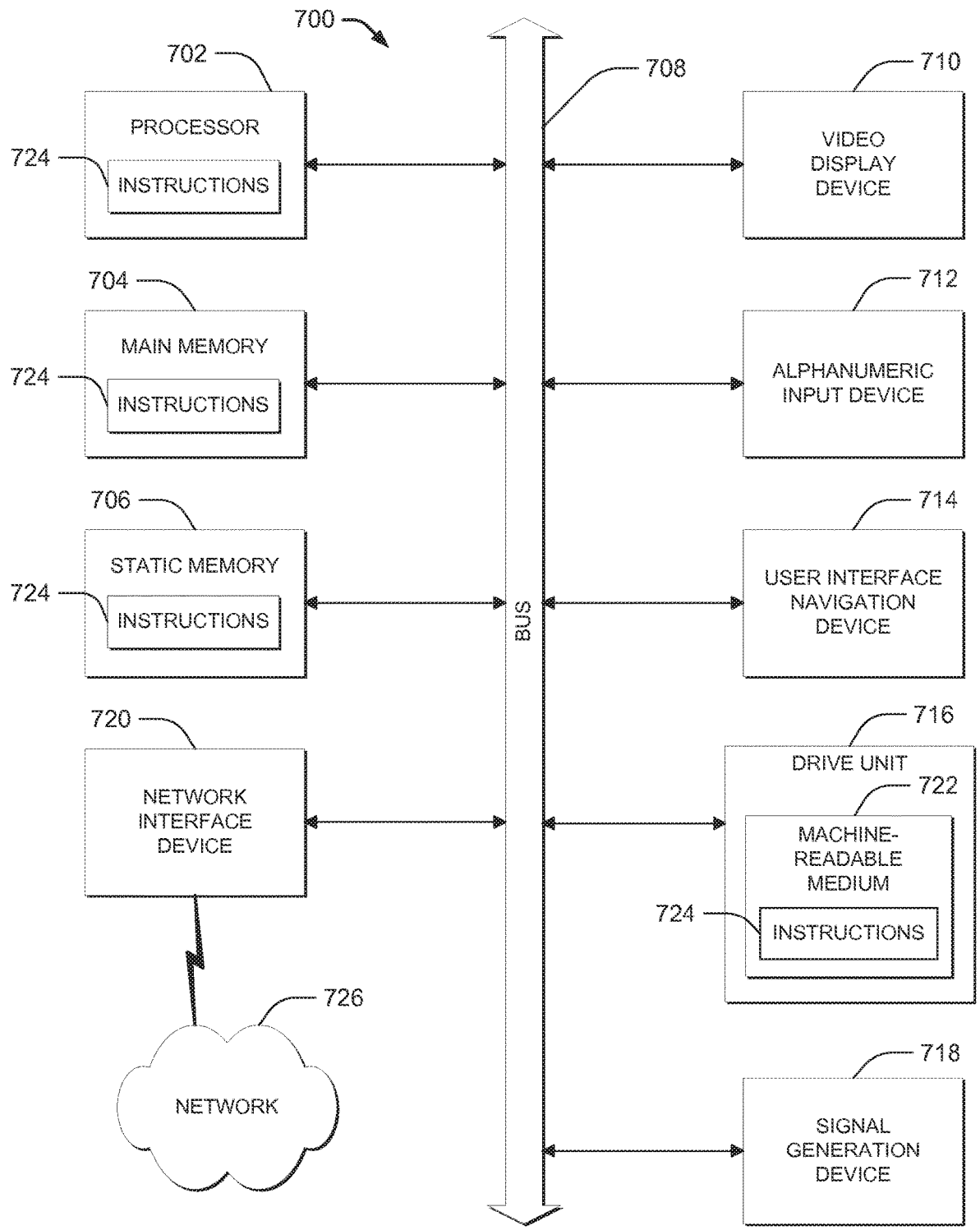
FIG. 7 is a block diagram of a machine in the example form of a computer system within which a set of instructions, for causing the machine to perform any one or more of the methodologies discussed herein, may be executed, according to some embodiments.

FIG. 7 is a block diagram of a machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
    receiving an identification request at a retrieval service operating on a first server, wherein the identification request is sent from a requesting service operating on a second server, and wherein the identification request was initiated by a first redirection action of a web browser;
    responsive to the identification request, determining a unique identifier for a user of a user account corresponding to the retrieval service, wherein the user has previously logged into the user account via one or more web browsers of a user computing device; and
    sending a redirect request from the retrieval service to the web browser, wherein the redirect request sent from the retrieval service to the web browser includes the unique identifier for the user, wherein the redirect request is configured to automatically redirect the web browser from a retrieval service website to a website associated with the requesting service such that the unique identifier is provided to the requesting service, and wherein the unique identifier is used by the requesting service to perform additional functionality specific to an identity of the user, including using the unique identifier to access information associated with the user of the user computing device that is stored in a database of the requesting service.

2. The method of claim 1, wherein the retrieval service is configured to determine the unique identifier by accessing a browser cookie of the web browser, wherein the browser cookie is not directly accessible by the requesting service.

3. The method of claim 2, wherein the browser cookie is included in the identification request.

4. The method of claim 1, wherein the retrieval service is configured to determine the unique identifier by presenting the user with a login interface corresponding to the user account.

5. The method of claim 4, wherein the user is presented with the login interface in response to a determination that the retrieval service cannot access a particular browser cookie that indicates the user is currently logged into or was previously logged into the user account.

6. The method of claim 4, wherein the retrieval service corresponds to a social networking website and the user account is a social networking account.

7. The method of claim 1, wherein the retrieval service corresponds to a social networking website and the user account is a social networking account.

8. The method of claim 1, further comprising:
determining whether the requesting service is enrolled with the retrieval service; and
tracking information associated with redirection from the requesting service to the retrieval service.

9. The method of claim 1, wherein the additional functionality specific to the identity of the user includes serving customized web content to the user.

10. The method of claim 9, wherein the customized web content comprises advertising content.

11. The method of claim 9, wherein the customized web content comprises individualized content other than advertising content.

12. A non-transitory computer-readable medium having stored thereon instructions executable by a first server to cause the first server to perform operations comprising:
receiving an identification request at a retrieval service operating on the first server, wherein the identification request is sent from a requesting service operating on a second server, and wherein the identification request was initiated by a first redirection action of a web browser;
responsive to the identification request, determining a unique identifier associated with a user of a user account corresponding to the retrieval service, wherein the user has previously logged into the user account via one or more web browsers of a user computing device; and
sending a redirect request from the retrieval service to the web browser, wherein the redirect request sent from the retrieval service to the web browser includes the unique identifier associated with the user, wherein the redirect request is configured to automatically redirect the web browser from a retrieval service website to a website associated with the requesting service such that the unique identifier is provided to the requesting service, and wherein the unique identifier includes specific identity information about the user that is usable by the requesting service to perform additional functionality based on the specific identity information, including using the unique identifier to access information associated with the user of the user computing device that is stored in a database of the requesting service.

13. The non-transitory computer-readable medium of claim 12, wherein the retrieval service is configured to determine the unique identifier by accessing a browser cookie of the web browser, wherein the browser cookie is issued by a website corresponding to the retrieval service.

14. The non-transitory computer-readable medium of claim 13, wherein the browser cookie is included in the identification request.

15. The non-transitory computer-readable medium of claim 12, wherein the specific identity information includes at least one item of demographic information.

16. A system, comprising:
a processor;
a network interface device; and
a non-transitory computer-readable medium having stored thereon instructions executable to cause the system to perform operations comprising:
receiving an identification request at a retrieval service operating on a first server, wherein the identification request is sent from a requesting service operating on a second server, and wherein the identification request was initiated by a first redirection action of a web browser;
responsive to the identification request, determining a unique identifier associated with a user of a user account corresponding to the retrieval service, wherein the user has previously logged into the user account via one or more web browsers of a user computing device; and
sending a redirect request from the retrieval service to the web browser, wherein the redirect request from the retrieval service to the web browser includes the unique identifier, wherein the redirect request is configured to automatically redirect the web browser from a retrieval service website to a website associated with the requesting service such that the unique identifier is provided to the requesting service, and wherein the unique identifier is used by the requesting service to perform additional functionality specific to an identity of the user, including using the unique identifier to access information associated with the user of the user computing device that is stored in a database of the requesting service.

17. The system of claim 16, wherein the retrieval service website is associated with a predetermined web address associated with the requesting service.

18. The system of claim 16, wherein the unique identifier included in the redirect request is specific to the requesting service.

19. The system of claim 16, wherein the retrieval service is configured to determine the unique identifier by presenting the user with a login interface corresponding to the user account.

20. The system of claim 19, wherein the user is presented with the login interface in response to a determination that the retrieval service cannot access a particular browser cookie that indicates the user is currently logged into or was previously logged into the user account.

* * * * *